Jan. 1, 1957  A. L. STONE  2,776,058
APPARATUS FOR HANDLING PIPE IN A DERRICK
Original Filed March 14, 1950  6 Sheets-Sheet 1
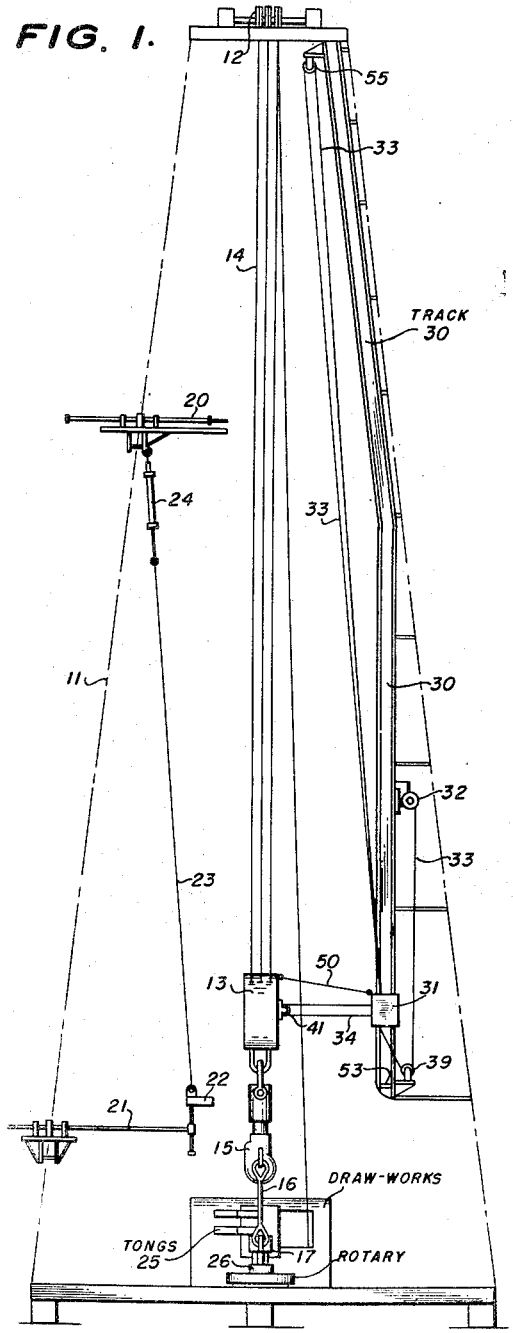
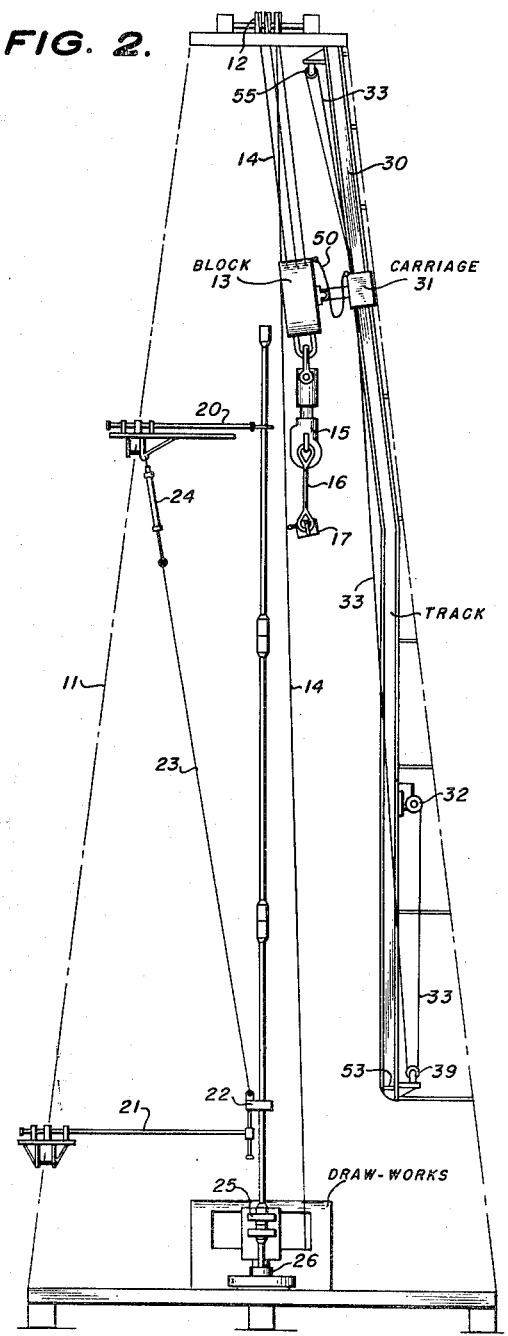
INVENTOR.
ALBERT L. STONE,
BY
ATTORNEY.

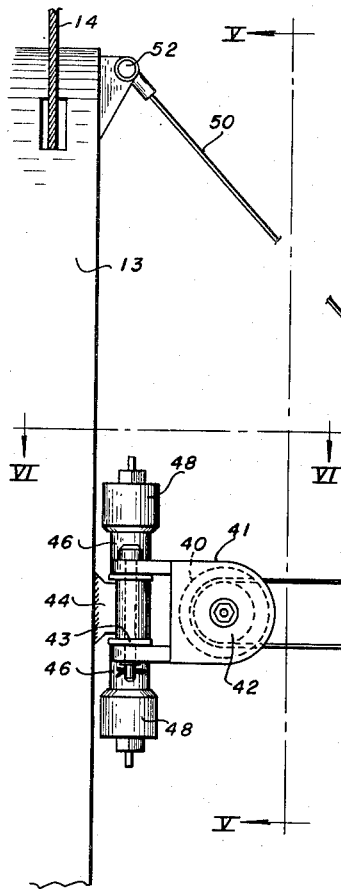
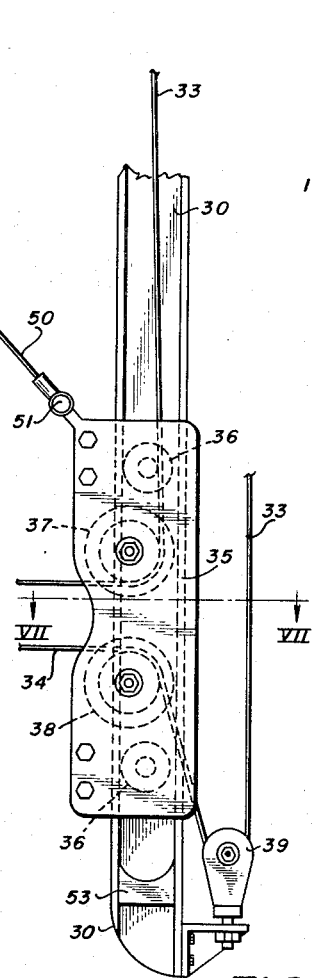
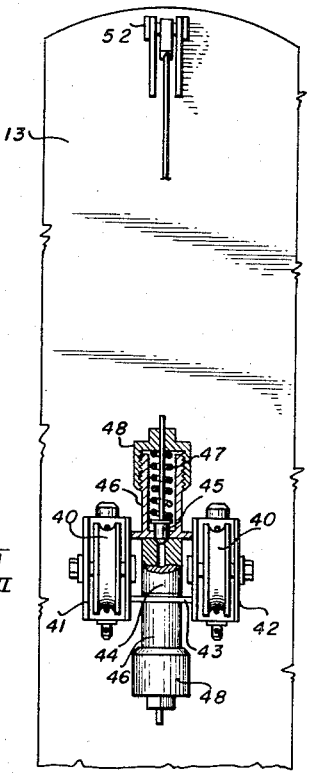
FIG. 3.  FIG. 4.  FIG. 5.
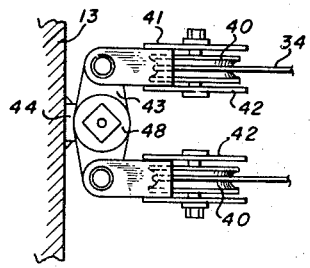
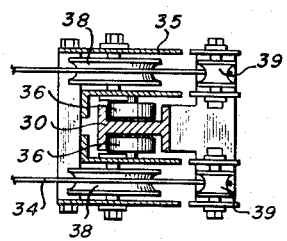
FIG. 6.  FIG. 7.
INVENTOR.
ALBERT L. STONE,
BY
ATTORNEY.

INVENTOR.
ALBERT L. STONE,
BY
ATTORNEY.

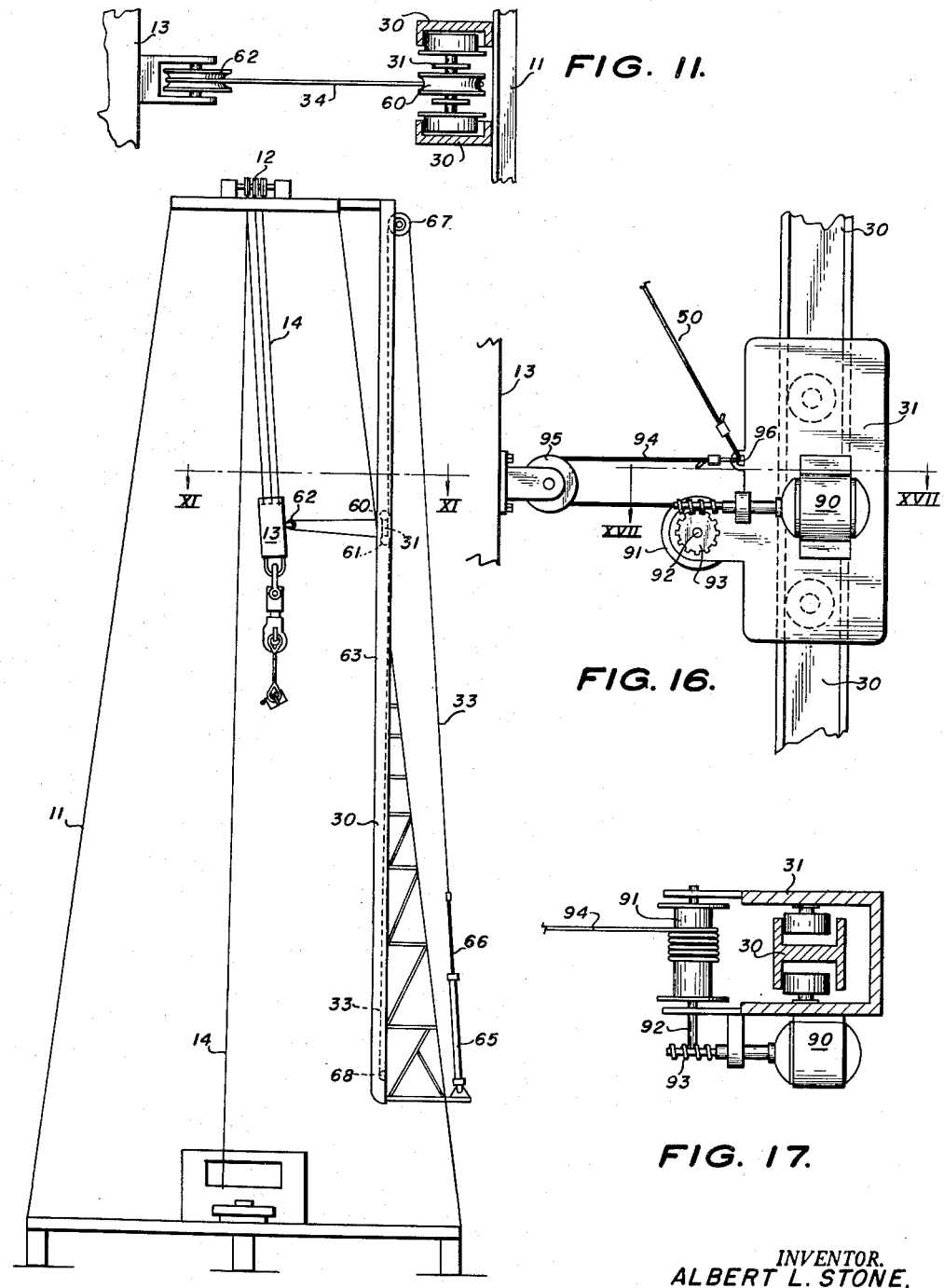

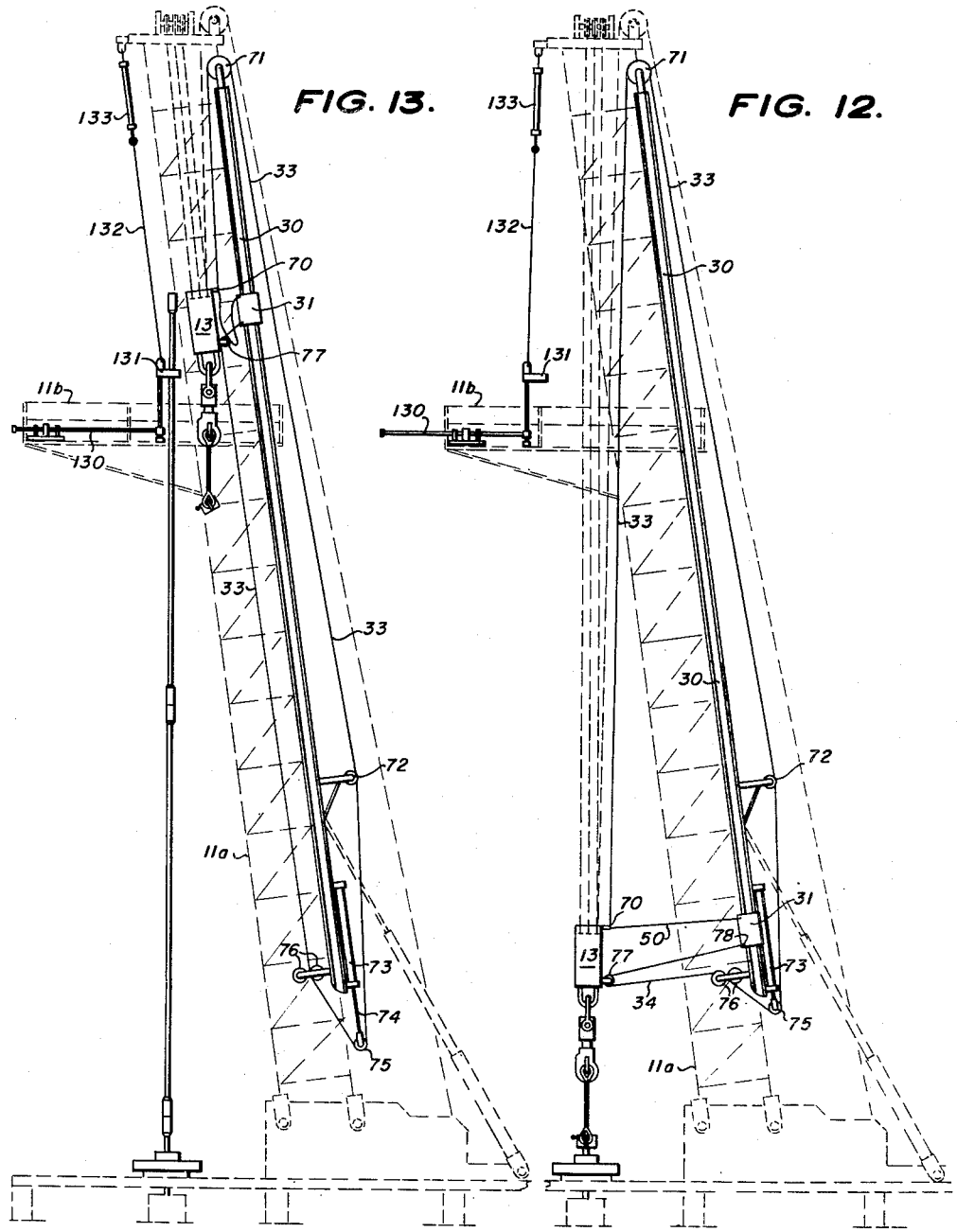

INVENTOR.
ALBERT L. STONE,
BY
ATTORNEY.

United States Patent Office 2,776,058
Patented Jan. 1, 1957

2,776,058
APPARATUS FOR HANDLING PIPE IN A DERRICK

Albert L. Stone, Palos Verdes Estates, Calif., assignor, by mesne assignments, to Esso Research and Engineering Company, Elizabeth, N. J., a corporation of Delaware Original application March 14, 1950, Serial No. 149,514, now Patent No. 2,735,556, dated February 21, 1956. Divided and this application July 13, 1955, Serial No. 521,663

5 Claims. (Cl. 214—2.5)

The present invention is directed to apparatus adapted for handling pipe in a derrick. More particularly, the invention is directed to apparatus adapted for handling vertical lengths of pipe.

This application is a divisonal application of Serial No. 149,514, filed March 14, 1950, for Albert L. Stone and entitled "Apparatus for Handling Pipe in a Derrick," now U. S. Patent 2,735,556, issued February 21, 1956.

In the drilling of oil wells and in other well boring operations in which vertical lengths of pipe, known as stands, are employed, it is frequently necessary to suspend the drilling operation and to pull the pipe from the hole. This may be necessary, for example, when the drill bit becomes worn and it is necessary to replace it. When such operations are required, a considerable amount of time is lost due to the fact that the pipe must be pulled from the hole. When it is considered that deep wells of as much as 10,000 feet in depth may require over 100 stands of pipe of 90 feet in length, it will be seen that it is a tedious and time-consuming operation to pull the pipe from the hole, replace the drill bit and return the pipe in the hole before the drilling operations may be resumed. When the pipe is being pulled out of the hole the traveling block is performing a useful function, but once a stand of pipe is out of the hole and is being broken loose from the drill pipe, the traveling block is idle and must remain in the top of the derrick until the stand has been moved out of the path of the traveling block and racked in a suitable racking position. The empty traveling block is then allowed to descend to bring up another stand and the operation is repeated. The amount of time consumed each time a length of pipe is brought up, broken loose and moved back, approximates 30 to 55 seconds. During this time the traveling block is still in the top of the derrick while the pipe stand is being moved out of position. Considering the handling of 90 to 100 or more pipe stands of 90 feet in length, it will be seen that valuable time is irretrievably lost.

It is, therefore, a general object of the present invention to provide an improved apparatus adapted to be used in a derrick which allows the traveling block or main load-carrying member to traverse the height of the derrick while a pipe stand is being manipulated within the path of free suspension of the traveling block.

Another object of the present invention is to provide apparatus for controlling the path of travel of the unloaded traveling black as it is raised and lowered in a derrick.

Another object of the present invention is to provide apparatus for use in a derrick in conjunction with a traveling block, which enables the traveling block to be raised and lowered in the derrick in substantially uninterrupted sequence during the operation of pulling a string of drill pipe from a well or of running it into the well.

Still another object of the present invention is to provide power-operated apparatus associated with a traveling block and controllable at the will of an operator to permit the traveling block when loaded to be raised or lowered along its path of free suspension at the center-line of the derrick and, when it is unloaded, to move it laterally into and maintain it in an offset path.

A still further object of the present invention is to provide new and useful apparatus to facilitate the handling of vertical lengths of pipe in a derrick.

Other objects will be apparent to those skilled in this art from the following description of several embodiments of the invention, reference being had to the accompanying drawings in which Fig. 1 is a side view of one embodiment of the improved apparatus of the present invention, showing the traveling block in the lower portion of the derrick on the center-line thereof;

Fig. 2 is a view similar to Fig. 1 but showing the traveling block in the upper portion of the derrick and in a laterally offset position;

Fig. 3 is a fragmentary side view showing a portion of a traveling block with apparatus forming a part of the invention attached thereto;

Fig. 4 is a side elevational view showing the lower portion of a guide member with a runner mounted thereon, this view taken in conjunction with Fig. 3 showing the relative positions of the runner and the traveling block;

Fig. 5 is a front elevational view showing a portion of the traveling block as viewed from line V—V of Fig. 3, with parts broken away to show constructional details;

Fig. 6 is a view taken on line VI—VI of Fig. 3;

Fig. 7 is a view taken on line VII—VII of Fig. 4;

Fig. 10 is a side elevational view of a still further embodiment of the invention;

Fig. 11 is a horizontal sectional view taken on line XI—XI of Figure 10;

Fig. 12 is a side elevational view of a still further embodiment of the invention, showing the traveling block near the derrick floor and at the center-line thereof;

Fig. 13 is a view similar to Fig. 12 but showing the traveling block in the upper portion of the derrick in a laterally offset position;

Fig. 16 is a fragmentary elevational view of a still further embodiment of the invention; and Fig. 17 is a horizontal sectional view taken on line XVII—XVII of Fig. 16.

In the various embodiments of the invention identical numerals will be employed to identify identical parts.

Figures 8, 9:
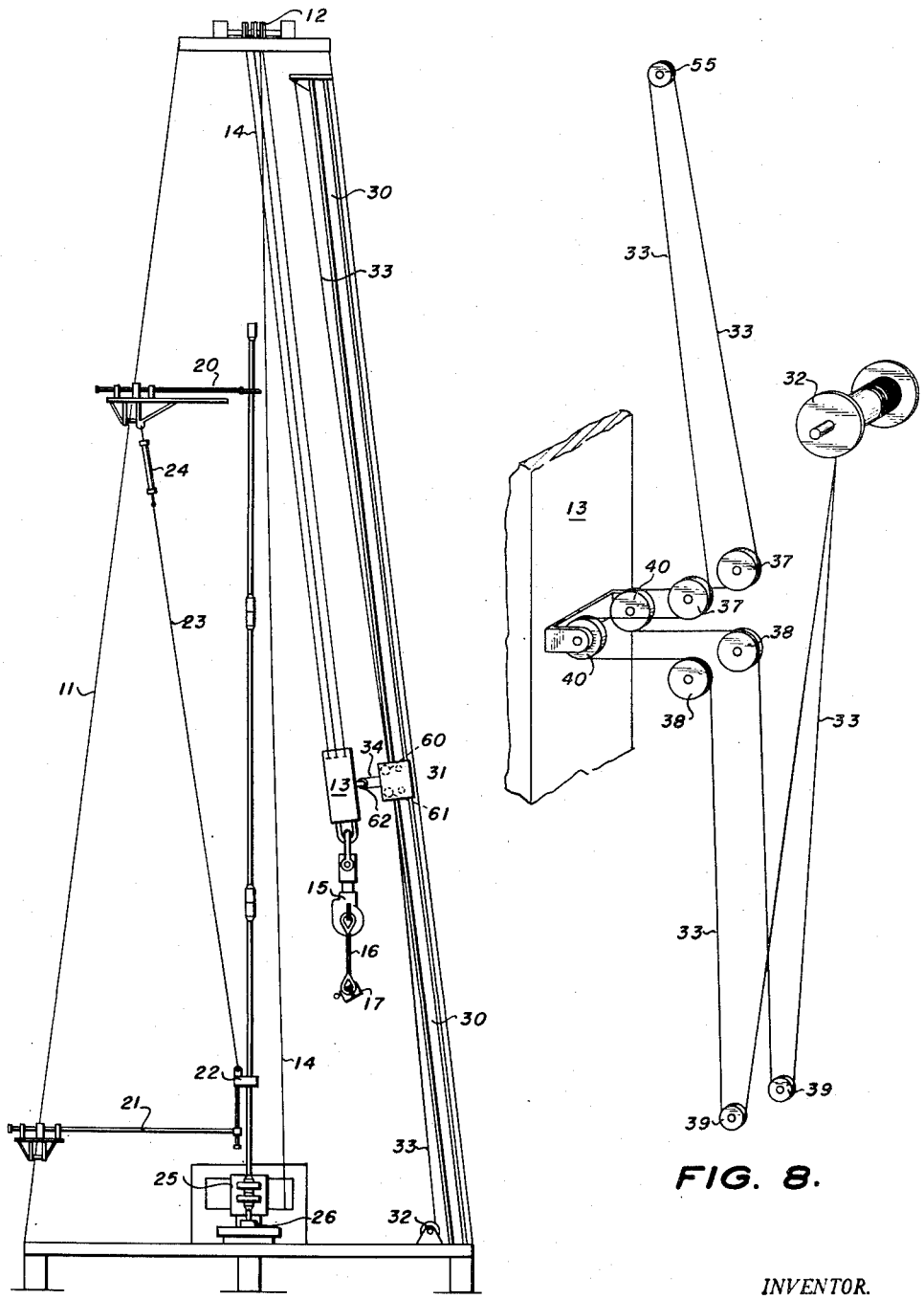
Fig. 8 is a schematic view of the arrangement of sheaves and lines connecting the various elements of the apparatus, the elements themselves being omitted in the interest of clarity.
Fig. 9 is a side elevational view showing another embodiment of the invention.

In its broad, generic sense my invention contemplates the provision, in a derrick having a main load-carrying member or device suspended from the top of the derrick on the center-line thereof, of an elongated guide member of a length at least equal to the length of a stand of pipe to be racked in a derrick. The guide member may be in the form of a rigid rail member. The main load-carrying device is operatively connected to the guide member in such manner that when the device is loaded, such as when pulling a string of drill pipe from the well bore or when running the pipe into the well bore, the device is freely suspended on the center-line of the derrick;

on the other hand, when the unloaded device is to be raised or lowered in the derrick the operative connection between the device and the guide member is such as to deflect the device laterally from its path of freely suspended travel into an offset path, and to maintain it in such offset path during its travel. The operative connection between the main load-carrying member and the guide member may include a runner or trolley member guided by the guide member, and a connection between the runner and the load-carrying member. The main load-carrying member, the guide member, and the runner member operatively connecting the load-carrying member to the guide member and the connection therebetween cooperate with the apparatus for supporting and moving a disconnected stand of pipe. Such apparatus for supporting and moving a disconnected stand of pipe includes an auxiliary load-carrying member supported in the derrick at a point removed from the center-line thereof and means for moving a vertical stand of pipe laterally in the derrick into or out of racking position. The means for moving a vertical stand of pipe laterally in the derrick may include means for grasping or engaging the outer periphery of a stand of pipe at its upper end or at its upper and lower end. The several elements of my invention cooperate in handling a section of drill pipe at the locus of the longitudinal axis of the derrick when the traveling block or main load-carrying device is unloaded and simultaneously maintains the device in a controlled path of travel offset to one side of the longitudinal axis while it is moved from one vertically spaced point to another.

In a generic sense, deflection of the main load-carrying member or the traveling block into its offset path of travel may be accomplished by the provision of power means operable either to effect relative lateral movement between the traveling block and the runner, or operable to change the position of the guide member. Apparatus embodying power means operable to effect relative lateral movement between the traveling block and the runner may assume various forms. Several embodiments of such apparatus will be described hereinafter.

Referring to Figs. 1 to 8, inclusive, these figures illustrate the embodiment of the invention wherein a stationary power means is operatively associated with the traveling block and a runner member by means of a flexible element which is operable to pull the traveling block laterally toward the runner member upon actuation of the power means. In this specific embodiment the flexible element extends throughout the length of the guide member mounted upright in the derrick and on which the runner member is mounted and the runner member traverses the length of the flexible element as it moves upwardly and downwardly in the derrick with the traveling block. In Figures 1 and 2 a conventional derrick, indicated at 11, is provided with the usual crown block 12 from which a conventional traveling block 13 is suspended by a drilling line 14. The crown block 12 is so positioned as normally to suspend the traveling block for movement along the center-line of the derrick and it is thus obvious in accordance with conventional practice that the traveling block must be maintained in the upper portion of the derrick in idle condition while a stand of pipe is disposed at the center-line of the derrick; also according to conventional practice the traveling block and the conventional hook 15, elevator links 16 and elevator 17 are used to support each stand of pipe while racking or unracking it in the derrick and while making up or breaking out the stand from the drill string. As stated previously, the use of this heavy-duty equipment to handle relatively light loads, such as single stands of drill pipe, and the enforced idleness of this equipment while the stands are being made up or broken out result in considerable lost time which could be saved if it were possible for the unloaded traveling block to be raised or lowered while the pipe stand is being made up or broken out and racked or unracked, as the case may be, by other apparatus which cooperates with the traveling block. In Figures 1 and 2 there are shown an upper pipe racker 20 and a lower pipe racker 21, each having at its inner extremity means for engaging the upper and lower portions of a stand of pipe. In this instance the upper racker 20 is provided with pipe engaging means which merely embraces the pipe to control its lateral movement without supporting the weight of the pipe and the lower racker 21 is provided with pipe engaging means in the form of an auxiliary elevator 22 which grips the pipe to support the weight thereof. The auxiliary elevator 22 is supported by a cable 23 the upper extremity of which is connected to the piston of a fluid actuated lifting cylinder 24. The tongs for making up and breaking out the pipe stands are indicated generally at 25. The provision of the pipe rackers 20 and 21 and the auxiliary elevator 22 would make it possible to raise or lower the unloaded traveling block in the derrick immediately after the weight of the drill string is transferred from the block to the usual pipe slips 26, were it not for the fact that the stand of pipe disposed at the center-line of the derrick is directly in the path of free suspension of the traveling block. To overcome this obstacle and make it possible to raise or lower the unloaded traveling block while the pipe stand is being made up or broken out and racked or unracked, as the case may be, I have provided means for moving the traveling block laterally into an offset path and for maintaining it in such path while it is being raised or lowered in the derrick.

In this embodiment of the invention the apparatus for moving the traveling block laterally into an offset path comprises in general a guide member 30 in the form of a rigid rail mounted substantially upright in the derrick, a runner member generally designated 31 mounted on the rail for guided movement therealong, a power-operated winch 32 supported in the derrick, and a flexible cable 33 connected to the winch 32 and extending downwardly and around sheaves 39 mounted adjacent the lower end of rail 30 and thence upwardly to the upper end of the rail. An intermediate portion of the cable has a bight portion 34 threaded through the runner member 31 and operatively connected to the traveling block. As shown in Figure 7, the rail 30 is an I-beam having an inner flange which serves as a trackway for the runner 31.

The runner 31 comprises a U-shaped frame 35 which embraces the sides and the inner face of the rail 30. Upper and lower pairs of rollers 36 project inwardly from the side plates of the frame 35 into the channels formed between the flanges of the rail 30, thus constraining the runner 31 to follow a path conforming to the longitudinal configuration of the rail. Also journaled on the side plates of the frame 35 are upper and lower pairs of sheaves 37, 37 and 38, 38 over which the cable 33 is trained to form the bight portion 34. As shown in Figures 3, 5, and 6, the extremity of the bight portion 34 is trained over sheaves 40 of a sheave assembly, generally designated 41, which is attached to the face of the traveling block 13. The sheave assembly 41 comprises sheave frames 42 pivotally connected to the ends of a rocker member 43 which is pivotally connected to a lug 44 welded or otherwise secured to the traveling block.

In order to avoid damage to the equipment resulting from severe overload, if desired the sheave assembly 41 may be connected to the traveling block by an overload release mechanism. An example of such a mechanism is shown in the cut-away portion of Fig. 5, wherein the lug 44 is provided with a beveled recess at each end to receive the beveled ends of a pair of plungers 45 which are slidable in housings 46 secured to the rocker member 43. The plungers 45 are yieldingly urged toward the lug 44 by springs 47 which bear against caps 48 threaded on the housings 46. The compression of the springs 47 may be regulated by adjusting the caps 48 on the housing, embodiments of the invention incorporates a rigid guide member mounted in fixed position in the derrick, a runner member movable along the guide member and guided thereby, a stationary power device, and a flexible element extending the length of the guide member and having one end anchored and the other end attached to the power device and having a bight portion reeved through the runner member and over a sheave attached to the traveling block. It will be apparent that in each embodiment when the line 33 is slacked off by the power device the bight portion 34 of the line is of sufficient length to enable the traveling block to be raised and lowered in the derrick along the center-line thereof, the runner 31 being moved along the rail 30 and along the line 33 in unison with the movement of the traveling block. When it is desired either to raise or lower the unloaded block along a laterally offset path, the power device is actuated to shorten the effective length of the line 33, thus reducing the length of the bight portion 34 and pulling the traveling block toward the runner 31. By reason of the reeving of the line 33 through the sheaves on the runner and on the traveling block the runner is free to move along the rail and along the line 33 with the traveling block; however, the tension in the line 33 maintains the traveling block in its offset path parallel to the rail 30.

In lieu of anchoring one end of the line 33 and attaching the other end of the power means, the line may be secured to the vertically movable unit consisting of the traveling block and the runner 31 so as to move therewith. An embodiment of the invention incorporating this feature is shown in Figs. 12 and 13, wherein one end of the line 33 is secured to the traveling block 13 at 70. The line extends from the block upwardly to the upper end of the rail 30 and over a sheave 71, thence downwardly along the outer side of the derrick, being guided by a guide roller assembly 72. A fluid-actuated cylinder-piston device 73 is mounted adjacent the lower end of the rail 30 with its piston rod 74 projecting downwardly and carrying a sheave 75 at its free end. The line 33 passes around the sheave 75, thence around sheaves 76 mounted on the inner side of the rail adjacent the lower end thereof, thence around a sheave 77 attached to the traveling block, the other end of the line being secured to the runner 31 at 78.

As shown in Fig. 12, with the piston rod 74 retracted the portion 34 of the line 33 extending substantially horizontally between the runner 31 and the traveling block 13, is of sufficient length to permit the traveling block to be raised or lowered along the center-line of the derrick, during which movement the runner 31 is similarly moved along the rail 30 and the line 33 travels around the sheaves 71, 75, and 76. When the piston rod 74 is extended as shown in Fig. 13, the portion 34 of the line is shortened thereby to pull the traveling block laterally into close proximity to the runner 31, in which relative positions the traveling block and runner may move as a unit along the rail 30.

Figs. 12 and 13 also illustrate the use of the invention in a derrick other than a conventional four-legged derrick. In this instance the derrick 11a is of the "mast-type" which is becoming increasingly popular because of its ready portability and ease of erection and removal. The racking platform 11b commonly provided in the upper portion of this type of derrick for supporting the racked stands of drill pipe may also carry the racker 130, as shown, or if preferred a separate framework may be provided for this purpose either above or below the platform 11b.

As an alternative to the provision of the stationary power means and the flexible element 33 of the previously described embodiments, the power means may, if desired, be mounted on the traveling block or on the runner 31, with a flexible element extending only from the power means to the runner or to the traveling block as the case may be. This possesses the advantage of eliminating the flexible element extending the length of the rail, but necessitates either conducting energy to the movable power means or providing a source of energy movable with the power means.

Figures 14, 15:
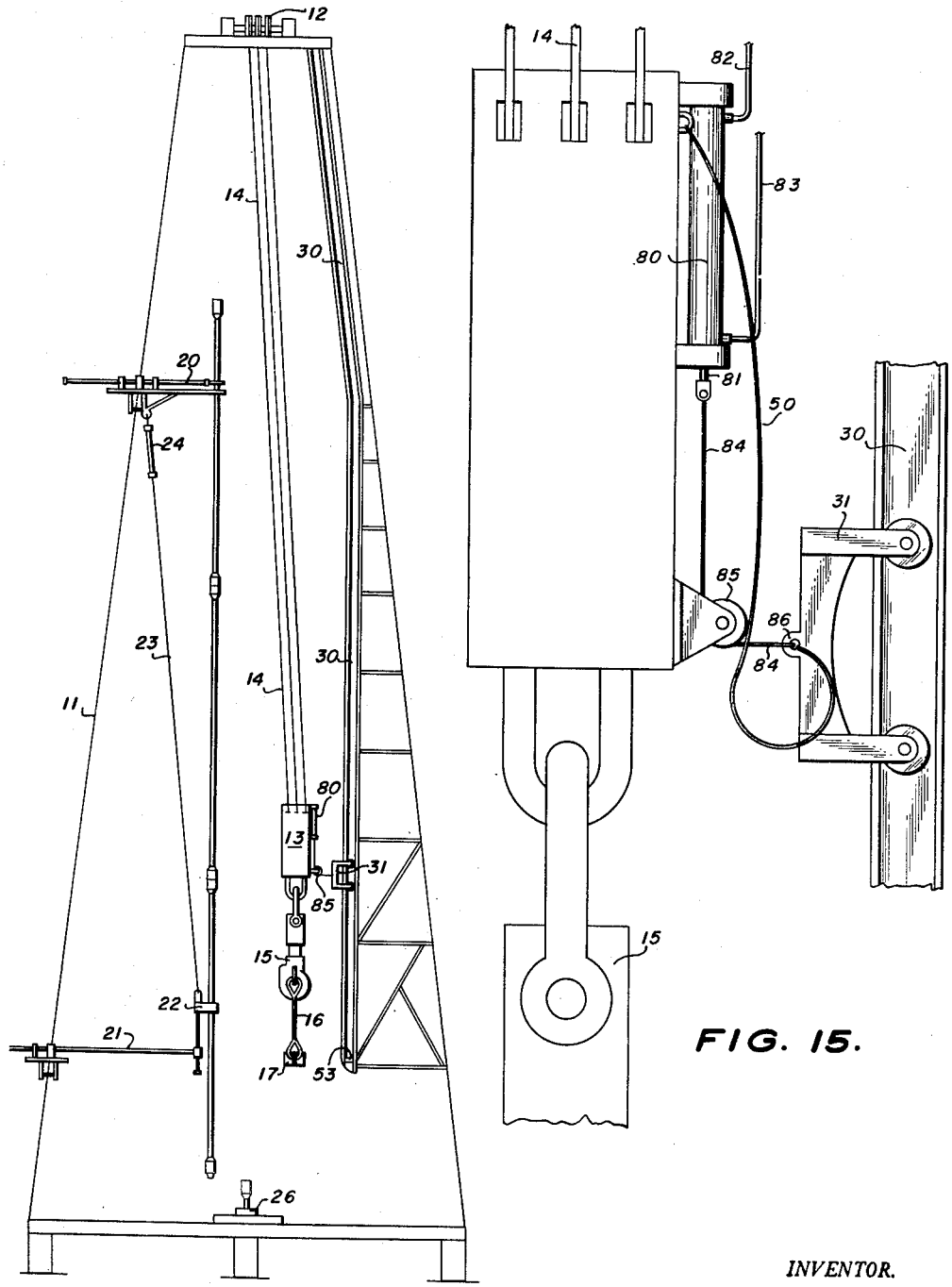
Fig. 14 is a side elevational view showing a still further embodiment of the invention.
Fig. 15 is an enlarged fragmentary view of the apparatus of Fig. 14.

Referring to Figs. 14 and 15, a power means in the form of a fluid-actuated cylinder-piston device 80 is mounted on the face of the traveling block 13 with its piston rod 81 projecting downwardly. Pressure fluid may be conducted to the cylinder through conduits 82 and 83 from any suitable source under control of valve mechanism, not shown. A cable 84 is connected at one end to the piston rod and extends around a sheave 85 attached to the traveling block and has its other end secured to the runner 31 at 86. A supporting line 50 is also secured at its lower end to the runner 31 and at its upper end to the upper portion of the traveling block to support the runner at substantially the level of the sheave 85. If desired, the connection of both lines 50 and 84 to the runner at 86 may be by means of a shear pin which will shear and release the runner from the traveling block in the event an unduly severe load is applied, to avoid damage to the apparatus.

In the operation of this embodiment of the invention, when it is desired to move the traveling block laterally into its offset path the power means 80 is energized to retract the piston, thus pulling the traveling block toward the runner 31 into the position shown in Figs. 14 and 15 and maintaining it in such position while the block is raised or lowered along an offset path parallel to the rail 30. This form of the invention not only eliminates the line 31 extending the length of the rail, but also makes it possible to employ a more lightweight runner inasmuch as no sheaves are required on the runner.

As an alternative to mounting the power means on the traveling block, it may instead be mounted on the runner. This is illustrated in Figs. 16 and 17 wherein there is shown a prime mover 90 of the rotary type, which may be either an electric motor or a fluid motor, mounted on the side of the runner 31. A drum 91 is secured to a shaft 92 journaled in the side plates of the runner, the shaft being operatively connected to the motor 90 by suitable gearing, shown herein as worm gearing 93. A cable 94 is wound on the drum and extends laterally and around a sheave 95 attached to the traveling block 13, the end of the cable being secured to the runner at 96. A supporting line 50 extends from the runner to the upper portion of the traveling block to support the runner in proper lateral alignment with the sheave 95. It will be obvious that if desired, the free end of the cable 94 could be attached to the traveling block and the sheave 95 dispensed with, in which case, however, the required torque on the drum shaft would be doubled.

It will be observed that in each of the various embodiments of the invention thus far described, the guide member is in the form of a rigid rail 30, preferably constructed of conventional structural steel and rigidly mounted in the derrick. Different forms and mounting arrangements of such rails are illustrated, and it will be understood that any one of them may be used in conjunction with any of the various power transmission arrangements.

From the foregoing descriptions of the various embodiments of the invention, it will be apparent that in each instance there is provided power means operatively connected to the traveling block and operable at will selectively to permit the traveling block to be raised or lowered along its normal path of free suspension at the center-line of the derrick, or to move the unloaded traveling block laterally into an offset path and to maintain it in such path while it is being raised or lowered in the derrick. The provision of apparatus capable of performing this function, in conjunction with other apparatus for supporting and handling the stands of pipe independently of the traveling block, makes it possible and thus regulate the lateral force required to cam the beveled ends of the plungers 45 out of the beveled recesses in the lug 44 against the action of the springs 47, to release the sheave assembly 41 from the traveling block.

It will be apparent that the operative connection between the runner 31 and the traveling block provided by the bight portion 34 of the cable 33, would alone cause the runner to move along the rail 30 in unison with the raising and lowering of the traveling block. However, in order to avoid relying solely on the bight portion 34 to support the runner 31 from the traveling block, and in order to maintain the runner more nearly in horizontal alignment with the sheave assembly 41 than would otherwise be the case, a supporting line 50 preferably extends directly between the runner and the traveling block. As shown in Figures 3 and 4, one end of the line 50 is attached to the runner at 51, the other end being attached to the upper portion of the block at 52.

When pulling the drill string from the well, it is not only highly desirable but essential for various reasons that the unloaded block be permitted to return to the center-line of the derrick after descending along its laterally offset path. For example, certain elevators cannot be engaged with the pipe if they are suspended in offset relation to the pipe. Also, if the weight of the drill string is abruptly applied to the block while the block is off-center even by a few inches, the sudden application of the load whips the block toward the center-line and the momentum of the heavy block induces a violent vibratory motion in the block, causing it to whip back and forth toward and away from the guide rail, in case the initial offset is toward the rail. It is apparent that in the apparatus of this invention as thus far described, the weight of the runner 31 is always carried by the traveling block through either the supporting line 50 or the bight portion 34 of the line 33, or both lines. Even though the winch 32 be actuated to pay out the line 33 to allow the block to move toward the derrick center-line, the weight of the runner 31 will exert a lateral component of force on the block, tending to move it off-center toward the runner and the rail 30. When the block is at its lower limit of travel its radius of swinging movement, as represented by the distance between the crown block and the traveling block is quite considerable. Hence the angular offset corresponding to a lateral displacement of the block sufficient to cause undesirable vibration is very slight and can be produced by the weight of a relatively light-weight runner.

This undesirable lateral displacement of the traveling block by the weight of the runner 31 when the block is adjacent the derrick floor is avoided by providing an abutment or stop 53 on the rail 30 adjacent its lower extremity, the abutment 53 being disposed in the path of an element of the runner so as to be engaged thereby to support the runner independently of the traveling block. As shown in Figure 7, the abutment 53 may consist of a block welded or otherwise secured in each of the channels of the I-beam, in the path of the lower rollers 36 of the runner 31.

In some derricks the maximum permissible offset of the rail 30 from the center-line of the derrick is so restricted by the derrick dimensions that it is necessary to move the traveling block into close proximity to the rail in order to provide adequate clearance between the traveling block and a stand of pipe disposed at the derrick center-line. The provision of a single upper sheave 37 and lower sheave 38 disposed in the central plane of the runner 31 and the rail 30 would unduly restrict the extent of offset of the block. However, the double sheave arrangement shown in Figures 6 and 7 overcomes this difficulty by disposing the sheaves 37 and 38 at the sides of the rail, two sets of sheaves being required in order to equalize the lateral forces acting on the runner and rail. This arrangement obviously necessitates the use of a double line, the reeving of which through the various sheaves is shown most clearly in Figure 8. It will be noted by reference to this figure that the double line extends from the winch 32 downwardly and around stationary sheaves 39 mounted adjacent the lower end of the rail 30, thence upwardly to the runner and around the lower sheaves 38, the bight portions 34 extending laterally from the runner and around the sheaves 40, thence back to the runner and around sheaves 37 and then upwardly to the upper end of the rail 30. In order to equalize the stresses in the two parallel sections of the line, the line is trained over a sheave 55 mounted adjacent the upper extremity of the rail.

In order to dispose the laterally offset path of travel of the unloaded traveling block at a sufficient distance from the center-line of the derrick, it may be necessary to vary the shape or the manner of mounting of the rail 30 in order to accommodate various derrick dimensions. For example, in the embodiment shown in Figures 1 and 2 the rail 30 comprises a major lower section which is disposed vertically in the derrick, this section extending upwardly substantially to the point of convergence with the inclined adjacent side of the derrick. The portion of the rail above this point inclines upwardly and inwardly substantially parallel to the side of the derrick.

In Figure 9 there is shown an alternative rail construction wherein the rail 30 is straight throughout its length and is mounted parallel to the adjacent side of the derrick. This type of rail may, if desired, be employed with the apparatus of the embodiment shown in Figures 1 to 8, but for illustrative purposes a slightly modified runner 31 and sheave arrangement is shown in Figure 9. In this instance, a single line 33 is employed, the lower extremity of which is secured to the winch 32 which is mounted on the derrick floor. The upper extremity of the line 33 is anchored at the upper extremity of the rail 30, and the bight portion 34 is trained over a single pair of upper and lower sheaves 60 and 61 journaled on the runner and over a single sheave 62 attached to the traveling block. It is assumed in this case that the derrick dimensions are such as to permit the mounting of sheaves 60 and 61 in the central plane of the runner 31, at the inner side of the rail 30.

Figs. 10 and 11 illustrate another modification which may be employed in a derrick 11 having a bulge in its upper portion permitting installation of a straight rail 30 in a vertical position. At substantially the point of convergence of the normally inclined side of the derrick with the rail, the upper portion of this side of the derrick extends vertically upward as indicated at 63, thus permitting the rail to extend vertically to the top of the derrick with a sufficient offset from the derrick center-line. For illustrative purposes, a still further modified form of rail, runner 31 and arrangement of the line 33 are shown in this embodiment. In this instance the rail 30 is shown as being substantially U-shaped, formed by securing two channel-beams face-to-face with a spacer member between their outer flanges, thus forming a slot between their inner flanges extending throughout the length of the rail, through which the bight 34 of the line 33 extends. The runner 31 in this instance is disposed within the rail, the rollers thereon engaging the inner flanges of the rail. The power means in this instance is shown as a fluid-actuated cylinder-piston device 65 mounted on the outer side of the derrick adjacent the base thereof. One end of the line 33 is attached to the piston rod 66, from which the line extends upwardly along the outside of the derrick and over a sheave 67 mounted at the top of the derrick. Thence the line extends downwardly within the rail 30, around sheaves 60, 61 and 62 and thence downwardly within the rail, the lower extremity of the line being anchored to the rail at 68.

It will be seen that each of the three above-described to initiate the raising or lowering of the unloaded traveling block immediately upon its disconnection from the drill string and to move it to the opposite side of the derrick while a stand of pipe is being disconnected from the drill stem string and racked, when coming out of the hole, or while it is being unracked and connected to the drill string when going in the hole.

An important part of the present invention is the apparatus for supporting the disconnected stands of pipe while they are being moved between the pipe rack and the center-line of the derrick and while they are being made up or broken out from the drill string. An example of apparatus suitable for this purpose is shown in Figs. 1 and 2 and comprises the previously described upper racker 20, lower racker 21 incorporating an auxiliary elevator 22, suspension line 23 and lifting cylinder 24. Similar apparatus is also shown in the embodiments of Fig. 9 and Figs. 14 and 15. For purpose of illustration, the embodiment of the invention shown in Figures 12 and 13 is illustrated in conjunction with only a single combined upper racker and auxiliary elevator, it being contemplated that in this instance the lower ends of the pipe stands will be manually manipulated in accordance with conventional practice. The racker is indicated generally at 130 and carries an auxiliary elevator 131 having limited vertical movement relative to the racker. A suspension line 132 extends between the elevator 131 and a lifting cylinder 133 mounted adjacent the top of the derrick. Pipe handling apparatus of the foregoing types form the subject matter of a copending application of Albert L. Stone, Serial No. 5,843 entitled "Apparatus for Racking Pipe in a Derrick," filed February 2, 1948, now abandoned.

It will also be understood, particularly by reference to Figs. 13 and 14, that the use of the invention is not limited to derricks of the four-legged type, but it may be used with "mast-type" derricks or with any other form of derrick the construction of which permits the installation of a guide member offset laterally from the center-line of the derrick and which also permits the installation of auxiliary supporting means for handling the disconnected stands. The term "derrick center-line," as used herein and in the appended claims, will be understood to mean an upward extension of the axis of the bore hole being drilled, along which the traveling block normally travels when freely suspended. It will also be understood that although a mast-type derrick has been shown only in conjunction with the particular embodiment of the invention shown in Figs. 12 and 13, any other embodiment of the invention is equally adaptable to use in such type of derrick or in any other type of derrick referred to above.

It is to be understood that the various embodiments shown and described herein are merely illustrative of the generic, sub-generic and certain specific aspects of the invention, and that various other specific aspects thereof will be apparent to those skilled in this art. What I wish to claim as new and useful and to secure by Letters Patent is:

1. Apparatus for use in a derrick having a load-carrying member flexibly suspended at the center-line thereof, comprising an elongated guide member adapted to be mounted substantially upright in the derrick, a runner member movable along said guide member and guided thereby, said load-carrying member and said runner member being interconnected for vertical movement in the derrick as a unit, a power device carried by one of the members of said unit and having an element operatively connected to the other element of said unit, said power device being operable to move said load-carrying member laterally out of its path of freely suspended travel and into an offset path substantially parallel to the path of travel of said runner member along said guide member.

2. Apparatus as set forth in claim 1, wherein said power device is carried by said load-carrying member, and said element is operatively connected to said runner member.

3. Apparatus as set forth in claim 1, wherein said power device is carried by said runner member, and said element is operatively connected to said load-carrying member.

4. Apparatus for use in a derrick having a travelling block flexibly suspended at the center line thereof, comprising a channel open box section comprising two channel members having a length at least that of a stand of pipe to be racked in the derrick as an elongated guide member adapted to be mounted substantially upright in the derrick, a runner member arranged between and in contact with both channel members and movable therealong and guided thereby, a single sheave mounted on the runner between the channel members, a single sheave mounted on the block, a single flexible element extending substantially the length of said guide member and having a bight portion threaded through said runner member in contact with its sheave and operatively connected to the sheave of said block whereby said runner member is caused to traverse the effective length of said flexible element during block travel, and a power device operatively connected to said flexible element for varying the effective length of said bight portion, to thereby selectively cause said block to travel along a laterally offset path or to permit said block to travel along its path of free suspension.

5. Apparatus for use in a derrick having a travelling block flexibly suspended at the center line thereof, comprising a channel open box section comprising a channel member having a length at least that of a stand of pipe to be racked in the derrick as an elongated guide member adapted to be mounted substantially upright in the derrick, a runner member arranged in contact with said channel members and movable therealong and guided thereby, a sheave mounted on the runner and arranged on said channel member, a sheave mounted on the block, a flexible element extending substantially the length of said guide member and having a bight portion threaded through said runner member in contact with its sheave and operatively connected to the sheave of said block whereby said runner member is caused to traverse the effective length of said flexible element during block travel, and a power device operatively connected to said flexible element for varying the effective length of said bight portion, to thereby selectively cause said block to travel along a laterally offset path or to permit said block to travel along its path of free suspension.

No references cited.